Dec. 5, 1967   J. H. RISEMAN ET AL   3,356,106
VALVE SYSTEM
Filed Aug. 16, 1965

INVENTORS
JOHN H. RISEMAN
DIMITER S. ZAGOROFF
BY Robert J. Schiller
ATTORNEY 3,356,106
VALVE SYSTEM
John H. Riseman, Cambridge, and Dimiter S. Zagoroff, Boston, Mass., assignors to Corning Glass Works, Corning, N.Y., a corporation of New York
Filed Aug. 16, 1965, Ser. No. 479,906
5 Claims. (Cl. 137—624.12)

This invention relates to fluid handling apparatus, and more particularly to a novel valving arrangement and a burette incorporating such a valving arrangement.

Manually operable burettes have been long known and used in circumstances where precisely measurable quantities of fluid are needed, such as in titrations and the like. Such a burette typically is formed as a tubular conduit having a delivery end constricted to form a dropper, and includes a stop-cock for controlling flow. The stop-cock comprises a tapered, conical valve seat disposed intermediate the ends of the burette. The entire burette, including the valve seat, is usually made of glass, the valve seat being generally ground and having a five-to-one or ten-to-one taper. The stop-cock comprises a mating plug also usually formed of glass and tapered to fit within the valve seat. A passage is provided transversely through the plug so that manual rotation of the latter can cause the passage to be occluded to a desired extent by one side or the other of the valve seat, thereby controlling flow of liquid from an upper portion of the burette through the passage and out of the delivery end.

It is difficult to achieve repeatedly precise discharge volumes or rates from the delivery end of such manually operable burettes except during full discharge. A number of automatic burettes have been proposed and are exemplified by having electrically controlled needle valves or the like. These frequently are delicate, complex, expensive, and constitute special equipment.

The present invention, therefore, has as a principal object the provision of a novel valve body suitable for use in the standard valve seat of an ordinary burette, and which overcomes many of the foregoing objections.

Further objects of the present invention are to provide a burette having a valve body which is manually adjustable to achieve coarse control of the discharge rate and which is operable electrically for fine control of the discharge rate; to provide such a valve body which is susceptible of a number of different modes of operation to achieve a desired and precise discharge rate from a burette; and to provide a novel valve of the type described which comprises a tapered conical valve body adapted to fit rotatably within the valve seat of a burette and which possesses inlet and outlet ports selectively communicable respectively with the interior portions of the burette on opposite sides of the valve seat, a valve chamber, first and second conduits within the valve body respectively joining the vave chamber with the inlet and outlet ports, a diaphragm mounted for movement between a first position wherein it blocks communication between at least one of the ports and the valve chamber and a second position wherein the diaphragm permits communication between the ports respectively through the conduits and the valve chamber, and electrically actuated means for moving the diaphragm from one of its positions to the other.

Yet another object of the present invention is to provide a burette having the valve of the type described, switch means for connecting the electrically actuated means to a steady state power source and for alternatively connecting the electrically actuated means to a pulsed electric power source or disconnecting the electrically actuated means from either power source.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

As used herein, the term "conical" is intended to refer not only to forms which are conical but those which are conical-like such as frusto-conical shapes and the like, either in part or in whole, cylinders, and variations thereof, all typified by having at least one axis of revolution.

Figure 1:
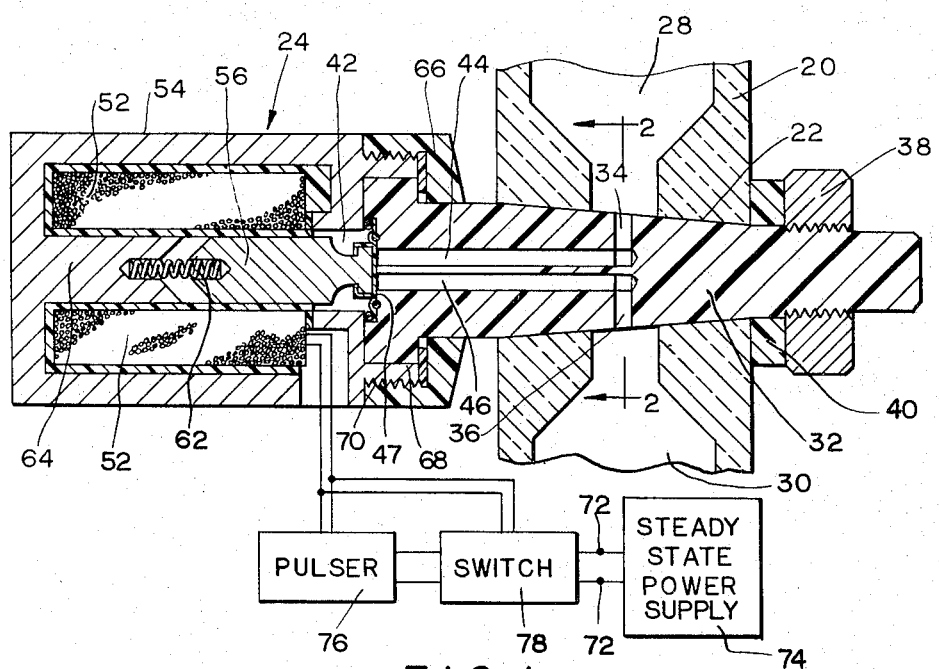
FIG. 1 is a cross-sectional view showing a valve formed according to the principles of the present invention including a valve body positioned in a valve seat of a burette, the latter being shown in fragment, and indicating the certain electrical elements in block diagram.
Figure 2:
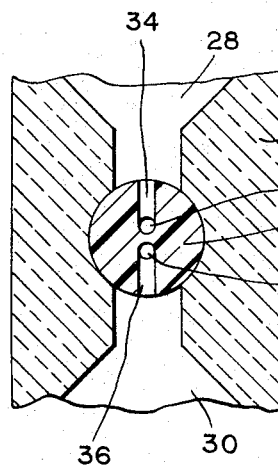
FIG. 2 is a cross-sectional view through the valve body taken along the line 2—2.
Figure 3:
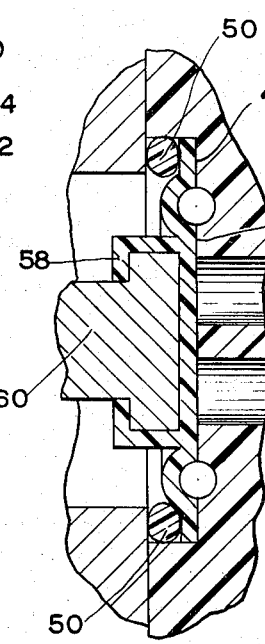
FIG. 3 is an enlarged view of the diaphragm valve portion of the embodiment of FIG. 1.

Referring now to FIG. 1 there will be seen an exemplary embodiment of the present invention comprising a conduit in the form of a typical burette 20, for example formed of glass, and having disposed substantially transversely of the tubular axis thereof a constricted portion defining the usual ground-glass valve seat 22.

Disposed at least partially within the valve seat is a valve, indicated generally at 24, including manually operable means for coarse controlling of discharge of fluid, for example from upper interior portion 28 of the burette into lower interior portion 30 of the latter. Valve 24 also includes electrically controllable means for fine control of discharge of fluid from portion 28 to portion 30 of the burette.

The manually operable means generally comprises elongated tapered, conical valve plug 32 shaped to provide a mating fit within valve seat 22 and adapted to be rotated within the latter. Preferably, valve plug 32 is formed either wholly, or at least about its peripheral surface in contact with the valve seat, of a material, such as polytetrafluorethylene or the like which is substantially chemically inert to fluids with which the valve is to be used, exhibits low coefficient of thermal expansion, is easily machined or formed, and provides a surface having a minimal coefficient of static friction with respect to the interior surface of valve seat 22.

Valve plug 32 includes an inlet port or passage 34 and an outlet port or passage 36 disposed to be communicable respectively with interior portions 28 and 30 of the burette when the valve body is properly rotationally positioned in mating contact with the valve seat. Means are provided for maintaining the valve body in that mating contact; to this end, valve plug 32 is dimensioned so that its smaller end extends outwardly of the burette and bears threads such that both nut 38 and washer 40 can be coupled thereto with washer 40 in contact with the exterior surface of the burette. Nut 38 and washer 40 serve to lock valve plug 32 into the valve seat so that the valve body is rotatable in the seat but not movable axially to any substantial extent. Ports 34 and 36 are connectable with one another as will appear hereinafter.

Means providing fine control of discharge of fluid from portion 28 to portion 30, includes valve chamber 42 disposed within valve 24 and connected through separate conduits 44 and 46, extending through valve plug 32, respectively with inlet port 34 and outlet port 36. Conduits 44 and 46 enter chamber 42 adjacent to but separate from one another through wall 47 of chamber 42 formed, for example by the wider end of body 32. Means are also included for controlling fluid communication between conduits 44 and 46 through chamber 42, and in the preferred form shown, particularly in FIG. 4, comprises a thin, substantially flexible diaphragm 48. The latter is typically a circularly shaped, thin, substantially flat, flexibly (preferably elastic) element formed for example of neoprene or the like. Diaphragm 48 is normally disposed so that a portion of the surface thereof is in contact with wall 47 in sealing relation with respect to both conduits 44 and 46. O-ring 50 is positioned in contact with periphery of the diaphragm so as to hold the latter normally in its sealing position for blocking communication between the conduits.

Means are also provided for flexing or moving the diaphragm transversely. Thus, valve 24 includes a substantially electrically controllable means comprising an electro-magnetic coil assembly or solenoid 52 supported within housing 54. Alternatively, solenoid 52 can be replaced with other electrically controllable devices providing linear motion such as a piezoelectric crystal. Disposed within the hollow center of solenoid 52, for movement substantially along the axis of the latter is an elongated magnetizable core or plunger 56. One end of the plunger is mechanically coupled substantially centrally of diaphragm 48. For this purpose, the diaphragm is provided with cap 58 extending therefrom, cap 58 being shaped internally so that enlarged portion 60 of the one end of the plunger can be locked thereto. Means, such as spring 62, are provided for resiliently biasing plunger 56 toward the diaphragm and thereby maintaining the latter in its sealing relation to conduit 44 and 46. Spring 62, for example, is a cylindrical spring having one end mounted on plunger 56 and the other end mounted upon anvil portion 64 of housing 54 such that the spring is maintained under compression and a predetermined clearance is maintained between anvil 64 and plunger 56 when the latter is solely under the influence of the spring.

Means are provided for locking valve plug 32 and housing 54 together, and includes cap 66 shaped to engage the valve body as at peripheral ridge 68 around the end of the valve body forming wall 47. Cap 66 is also internally threaded so as to be with peripheral thread portion 70 of housing 54.

The device thus described is operable in several modes, and to this end preferably includes means for applying electrical power to solenoid 52 in a selective manner. Such means comprises terminal 72 adapted to be connected to a source of substantially steady-state current, such as battery 74. Means, such as pulser 76 are included for generating a train of current pulses of predetermined duration and repetition rate, and may typically be a well-known multi-vibrator, blocking oscillator or the like. Also included are switch means 78 preferably of the double-pole double-throw type.

Figure 4:
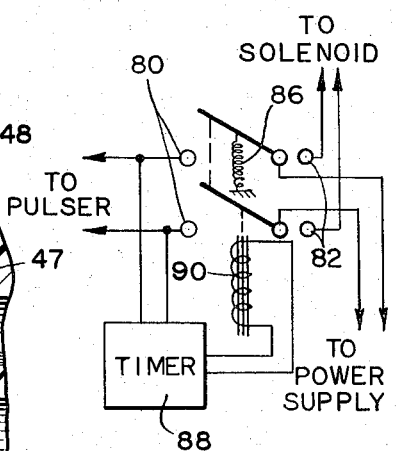
FIG. 4 is a detailed schematic of a switch forming a portion of a preferred embodiment of the invention.

As shown, particularly in FIG. 4, switch means 78 includes first pair of fixed contacts 80 connected to the input of pulser 76, second pair of fixed contacts 82 connected directly to solenoid 52, and the usual moveable pair of contacts or blades 84 connected to the output of the power supply or battery 74. Resilient means such as 86 are connected to moveable blades 84 for biasing the latter away from closure with fixed contacts 80. The latter are preferable of the type which, upon application of a minor amount of force on blades 84 can be momentarily contacted by the latter without being locked together. Thus, upon release of the minor manual pressure on blades 84, spring 86 will break the momentary closure between the blades 84 and contacts 80. However, upon application of a larger force to blades 84, the latter will releasably lock to contacts 80 such that the bias of spring 86 alone is not sufficient to unlock them.

Switch means 78 also includes timing means, such as timer circuit 88 of known type adapted to produce an electrical output a predetermined interval after being energized. Timer 88 has its input connected to contacts 80 and its output connected to relay 84. The armature of relay 88 is mechanically connected to blade 84 such that when the relay is energized, the movement of the armature can overcome any locked relation between blades 84 and contacts 80, driving the blade out of closure with contacts 80 with the aid of spring 86.

It will thus be seen, that when blades 84 are in contact with contacts 82, switch means 78 is in a first closed position wherein the battery energizes solenoid 52 directly with a steady-state current. When blades 84 in contact with contacts 80, or, in the second closed position of switch means 78, battery 74 is connected only for energizing pulser 76 and timer 88. Consequently, in the second closed position of switch means 78, solenoid 52 will be energized only by the pulse output of pulser 76. Of course, when blades 84 are disconnected from both contacts 80 and 82, switch means 78 is in its open position and solenoid 52 is not energized.

In operating the present invention in connection with a burette to accomplish a titration, it is preferred to employ entirely different modes of operation so as to achieve optimum performance. First, one employs the present invention to provide comparatively large amounts of reagents from the burette to the solution being titrated until, for example, local color changes begin to occur in the solution. Thereafter, it is desirable to reduce flow from the burette to a series of intermittent injections of reagent in small, precisely determined quantities. By injecting these quantities at timed intervals, sufficient time is allowed to mix or disperse the reagent thoroughly throughout the solution and, therefore, approach the end-point of the titration with accuracy. Lastly, for precise determination of the end point, it is preferred to operate the present invention to provide pre-determined, small quantities of reagent, one at a time, upon command, until the exact end-point is reached.

Such performance can be achieved in the following manner. Space 28 of the burette is filled with an appropriate titration agent and coarse control of the valve is set by closing switch means 78 to its second closed position at which a steady-state current energizes solenoid 52. This moves plunger 56 against the bias of spring 62, moving diaphragm 48 out of its sealing relation to conduits 44 and 46 and allowing a free flow of fluid from portion 28 to portion 30. Valve plug 32 is now rotated (preferably as an integral unit with the other elements of valve 24) within valve seat 22 until a predetermined part of either inlet port 34, or outlet port 36, or both, is blocked by a corresponding edge of the valve seat where the latter meets the respective interior wall of the burette. Thus, one can set the "steady-state" flow rate from the burette so as to provide the first or coarse mode of operation.

Using this coarse mode, one can dump at a comparatively low rate sufficient reagent into the solution being titrated, simply by manual closure of switch means 78 to its first position from an open position. As soon as a local color change occurs, switch means 78 is returned to its open position, deenergizing solenoid 52 and thereby permitting plunger 56 to move, under the bias of spring 62, into its sealing relation to conduits 34 and 36. In the preferred embodiment, the plunger and diaphragm have low inertial mass so that closure of the diaphragm upon conduits 44 and 46 can be achieved very quickly, i.e. in milliseconds or less, upon urging from a spring having appropriate spring constants.

The second mode of operation is now achieved by forcing blades 84 into locking relation with contacts 80, thereby energizing pulser 76. Typically, the latter provides a train of output pulses of 10 milliseconds duration with a repetition rate of 20 milliseconds. Thus, the output of the pulser, alternatively energizing and deenergizing solenoid 52, provides an intermittent passage of reagent through the valve. It will be seen that as the solenoid is successively deenergized the motion of the plunger toward conduits 44 and 46 will cause the diaphragm to operate as a pump, expressing any fluid reagent on the conduit side of the diaphragm out through the conduits. Thus, each pulse from the pulser causes a jet of reagent to be forced out of the burette, and one need not depend solely on gravity to provide reagent flow. In the interval between the jets of reagent from the burette, the predetermined amount of reagent expressed by each jet can be thoroughly dispersed as by mixing it mechanically in the solution being titrated. As soon as the entire solution begins to change color, indicating the onset of the end point, switch means 78 can be manually returned to its open position.

When running a number of similar titrations, the operator can be relieved of the necessity of manually breaking the contact between contacts 82 and blades 84. If the total time during which the pulser should continuously operate is known, or if it is desired to approach the end point by introducing reagent quantities larger than a single jet quantity and smaller than the quantities provided by the coarse control, one can set timer 88 so that after a predetermined period, which is a multiple of the jet intervals, for example, one second, the timer provides an output energizing relay 90 to drive blades 84 into their open position.

If one now wishes to introduce minute quantities of reagent of predetermined and equal size into the solution, upon command, i.e. one at a time, one need merely move blade 84 into momentary contact with contacts 80. Upon release of the pressure on blades 84 spring 86 will return the blade to an open position. However, as well known in the art, the momentary energizing of the pulser is sufficient to trigger the pulser so that it provides a single output pulse of fixed, predetermined duration, considerably more accurately than one could obtain by manual closure. For example, where the pulser is designed to provide 10 milliseconds pulses, momentary closure of switch means 78 in its second position to provide a momentary contact of undetermined duration of less than 30 milliseconds will nevertheless cause a precisely determined amount of reagent to be expressed from the burette.

Since certain changes may be made in the above apparatus without departing from the scope of the invention herein involved it is intended that all matter contained in the above description or shown in the accompanying drawing shall be interpreted in an illustrative and not in a limiting sense.

We claim:

1. In a conduit having a tapered stop-cock valve seat intermediate its ends, a valve comprising, in combination:

manually operable means for coarse controlling of discharge of fluid from said conduit; and
   electrically controllable means for fine controlling of discharge of fluid from said conduit;
   said manually operable means comprising a tapered conical valve plug adapted to fit rotatably within said valve seat; said plug having an inlet port communicable with the interior of said burette on one side of said valve seat and an outlet port communicable with the interior of said burette on the other side of said valve seat;
   said electrically controllable means including a valve chamber within said valve and conduit means joining said inlet port and outlet port with said valve chamber;
   a diaphragm mounted for movement between a first position wherein said diaphragm prevents communication between said chamber and at least one of said ports, and a second position wherein said diaphragm permits communication between said ports through said conduit means and said chamber;
   electrically actuated means for moving said diaphragm from one of said positions to the other; and
   terminal means adapted for coupling to a source of steady-state electrical power;
   switch means for connecting said electrically actuated means to means for providing pulsed electrical power or to said terminal means, or for disconnecting said electrically actuated means from any power.

2. In a conduit, a valve as defined in claim 1 wherein said body valve has a surface formed of material exhibiting a low coefficient of static friction with respect to the internal surface of said valve seat in contact therewith.

3. In a burette having a tapered stop-cock valve seat intermediate its ends, a valve comprising, in combination:

manually operable means for coarse controlling of discharge of fluid from said burette; and
   electrically controllable means for fine controlling of discharge of fluid from said burette;
   said manually operable means comprising a tapered conical valve plug adapted to fit rotatably within said valve seat;
   said plug having an inlet port communicable with the interior of said burette on one side of said valve seat and an outlet port communicable with the interior of said burette on the other side of said valve seat;
   said electrically controllable means including a valve chamber within said valve plug, a first conduit providing a fluid connection within said valve plug between said inlet port and said chamber, a second conduit providing a fluid connection within said valve plug between said outlet port and said chamber;
   a diaphragm disposed within said chamber and mounted normally in sealing relation at least to the access of said first conduit to said chamber;
   means connected to said diaphragm for moving the latter out of sealing relation, said means connected to said diaphragm comprising a magnetizable element mounted within an electrically conductive solenoid;
   means for applying electrical power of energizing said solenoid; and
   said means for applying electrical power comprises means for providing a train of electrical power pulses of predetermined duration at a predetermined repetition rate, means for providing steady-state electrical power, and said valve including; switch means movable between a first position wherein only said means for providing said train is connected for actuating said solenoid, a second position wherein said solenoid is disconnected from any electrical power, and a third position wherein only said means for providing said steady-state power is connected to said solenoid.

4. In a burette, a valve as defined in claim 3 including resilient means for biasing said magnetizable element so that said diaphragm is forced into said sealing relation.

5. In a burette, a valve as defined in claim 3 including timing means for controlling an interval during which said switch means can remain in said first position.

References Cited

UNITED STATES PATENTS

| | | | |
|---|---|---|---|
| 2,452,537 | 11/1948 | Anderson | 307—141 |
| 3,134,932 | 5/1964 | Ray | 251—141 |
| 3,195,856 | 7/1965 | Arrison | 251—368 |

FOREIGN PATENTS

| | | |
|---|---|---|
| 916,002 | 1/1963 | Great Britain. |

WILLIAM F. O'DEA, *Primary Examiner.*

H. M. COHN, *Assistant Examiner.*